(12) United States Patent
Cai et al.

(10) Patent No.: US 7,794,672 B2
(45) Date of Patent: Sep. 14, 2010

(54) CATALYTIC CONVERTER WITH SENSOR CAVITY

(75) Inventors: Haimian Cai, Ann Arbor, MI (US); Lakshmana Gummadi, Canon, MI (US); Xiaojun Zhang, Canton, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 917 days.

(21) Appl. No.: 11/652,163

(22) Filed: Jan. 11, 2007

(65) Prior Publication Data

US 2008/0170972 A1 Jul. 17, 2008

(51) Int. Cl.
*B01D 50/00* (2006.01)
*B21D 51/16* (2006.01)
(52) U.S. Cl. .......................... 422/180; 29/890
(58) Field of Classification Search .............. 422/177, 422/179, 180
See application file for complete search history.

(56) References Cited

U.S. PATENT DOCUMENTS

| 5,866,079 A | 2/1999 | Machida et al. |
| 6,162,404 A | 12/2000 | Tojo et al. |
| 6,589,910 B1 | 7/2003 | Swars |
| 6,919,052 B2 | 7/2005 | Foster et al. |
| 7,032,312 B2 | 4/2006 | Burnette et al. |
| 2004/0105792 A1* | 6/2004 | Worner et al. ............... 422/180 |

* cited by examiner

*Primary Examiner*—Tom Duong
(74) *Attorney, Agent, or Firm*—MacMillan, Sobanski & Todd, LLC

(57) ABSTRACT

A catalytic converter assembly is provided that includes a metallic tubular member having a first end and a second end. The metallic tubular member includes an aperture centrally formed between the first end and the second end. A sensor is received in the aperture and extends into an interior of the metallic tubular member for sensing a content of gas flowing through the metallic tubular member. At least one substrate is disposed within the metallic tubular member. The at least one substrate has a cavity formed in an exterior surface of the at least one substrate and extends radially inward. The cavity is aligned with the aperture of the metallic tubular member and receives a portion of the sensor extending into the interior of the metallic tubular member.

12 Claims, 4 Drawing Sheets

US 7,794,672 B2

CATALYTIC CONVERTER WITH SENSOR CAVITY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of Invention

This invention relates in general to catalytic converters, and more specifically, to catalytic converters with a mid-bed sensor.

2. Background of Related Art

Catalytic converters include one or more catalytic elements or substrates housed in a metallic housing. The housing includes a first end and a second end. Each end portion may be conical-shaped. The catalytic converters are typically manufactured by cutting a metallic tubular member to a desired length. A respective support element is disposed around a respective substrate and thereafter inserted within the housing. The housing is formed to a targeted dimension for securing the substrates therein. One or more respective substrates may be utilized within a respective catalytic converter. Substrates are typically secured by some means to prevent movement of the substrate within the housing such as press forming the housing and support member against the outer surface of the substrate. Two substrates utilized in a catalytic converter closely positioned next to one another are less susceptible to movement or tilting after the substrates are secured within the housing by deforming the housing radially inward. However, in certain instances, the substrates are required to be spaced from each other and may be subject to movement or tilting even though the housing and support member has been secured against the substrate.

One example is when a sensor is utilized. Sensors are commonly coupled to the housing for sensing gas content passing through the substrates. The sensor is inserted through the wall of the housing and extends into the interior air space between the spaced apart substrates. The aperture for receiving the housing is typically disposed equidistant between the ends of the housing so that the sensor is positioned between the substrates.

Moreover, design constraints may dictate that the length of the converter is shorter than what is desired to secure the substrates therein. Under such conditions, the axial length of the both substrates may be shortened to accommodate the shorter design packaging. The substrates will have a greater tendency to move and tilt as the axial length of each respective substrate gets substantially equal to or less than diameter of each respective substrate. The securing of the housing and support member against the substrates may not prevent movement or tilting of the respective substrates under such conditions. There is often a trade-off that must be made between spacing required to accommodate the sensor therebetween and the length of the substrates that must be used to prevent tilting of the substrate. Moreover, when packaging is not a concern, additional length may be added to each substrate and the housing to prevent the tilting issues discussed earlier, but such additional material adds material cost to the substrate and housing.

BRIEF SUMMARY OF THE INVENTION

The present invention has an advantage of utilizing a cavity formed in at least one substrate of a catalytic converter to receive a mid-bed sensor for monitoring gas content flowing through the catalytic converter. The cavity eliminates the typical space formed by a pair of substrates spaced apart from one another for receiving the sensor therebetween. The cavity allows the substrates to be packaged close to one another thereby maintaining a desired length of the substrates to prevent tilting of the substrates. This also has the advantage of reducing the overall axial length of the catalytic converter housing that house the substrates therein.

In one aspect of the present invention, a catalytic converter assembly is provided that includes a metallic tubular member having a first end and a second end. The metallic tubular member includes an aperture centrally formed between the first end and the second end. A sensor is received in the aperture and extends into an interior of the metallic tubular member for sensing a content of gas flowing through the metallic tubular member. At least one substrate is disposed within the metallic tubular member. The at least one substrate has a cavity formed in an exterior surface of the at least one substrate and extends radially inward. The cavity is aligned with the aperture of the metallic tubular member and receives a portion of the sensor extending into the interior of the metallic tubular member.

In yet another aspect of the present invention, a method is provided for forming a catalytic converter assembly having at least one substrate. A metallic tubular member is provided having a first end and a second end. The metallic tubular member has an aperture centrally formed between the first end and the second end and adapted to receive a sensor. The at least one substrate is inserted within the metallic tubular member. The at least one substrate has a cavity formed in an exterior surface of the at least one substrate and extends radially inward. The cavity is aligned with the aperture. The sensor extends through the aperture into an interior of the metallic tubular member to be received by the cavity formed in the at least one sensor. The sensor is secured to the metallic tubular member.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
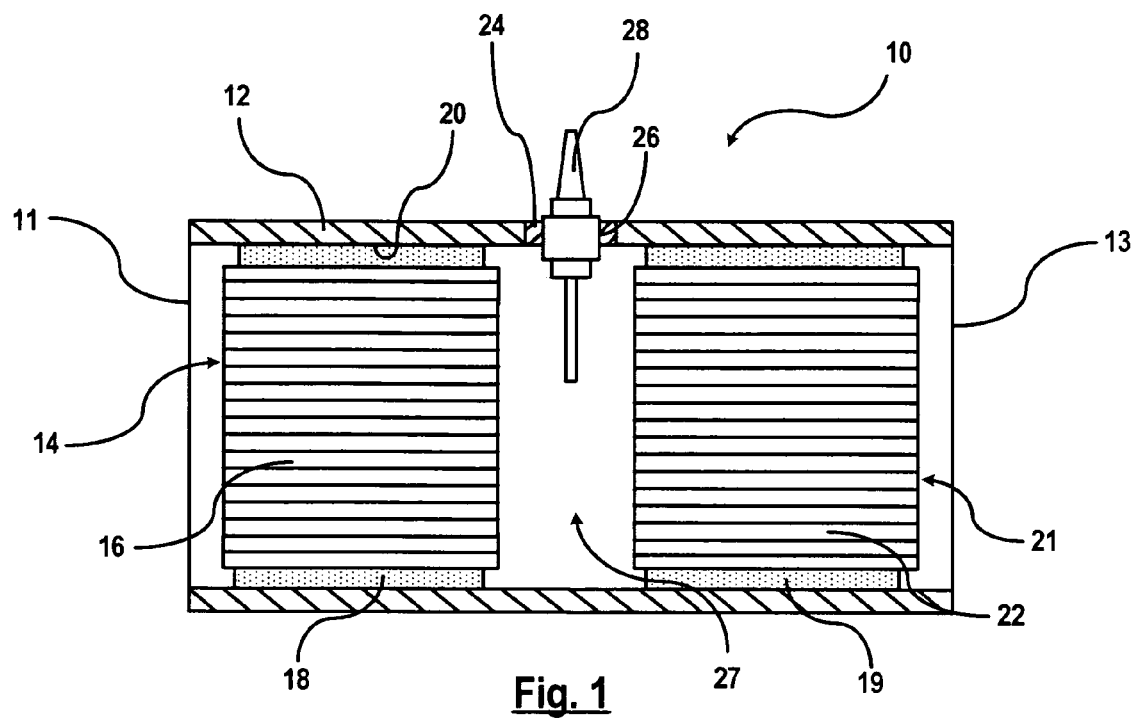
FIG. 1 is a cross section view of a prior art catalytic converter assembly.

Referring now to the drawings, there is illustrated in FIG. 1, a cross section view of a catalytic converter assembly 10. The catalytic converter assembly 10 includes a metallic tubular member that forms a housing 12. The metallic tubular member is produced from a corrosion resistant alloy such as a stainless steel alloy having a first end 11 and a second end 13. The first end 11 and the second end 13 may include tapered or conical-shaped ends (not shown).

A first catalytic element 14 comprises a first substrate 16 and a first support member 18 secured within an interior of the housing 12. An inner surface 20 of the housing 12 is pressed against the first catalytic element 14 for securing the first catalytic element 14 therein. Alternatively, the first catalytic element 14 may be stuffed into the housing 12.

The catalytic converter assembly 10 further includes a second catalytic element 21. The second catalytic element 21 comprises a second substrate 22 and a second support member 19 secured within an interior of the housing 12. An inner surface 20 of the housing 12 is pressed against the second catalytic element 21 for securing the second catalytic element 21 therein. Alternatively, the second catalytic element 21 may be stuffed into the housing 12.

The catalytic converter assembly 10 may further include a sensor boss 24. The sensor boss 24 is inserted through a housing aperture 26. The sensor boss 24 is secured to the housing 12. The sensor boss 24 receives a sensor 28 for measuring the gas content passing through the substrates. Due to the spacing 27 (i.e., gap width) between the respective substrates, movement or tilting of the respective substrates may occur during operation of the catalytic converter, and more so when a shortened substrate (e.g., axial length substantially equal to or less than the diameter of the substrate) is utilized which may lead to damage of the substrates and degradation of the operation of the catalytic converter.

Figure 2:
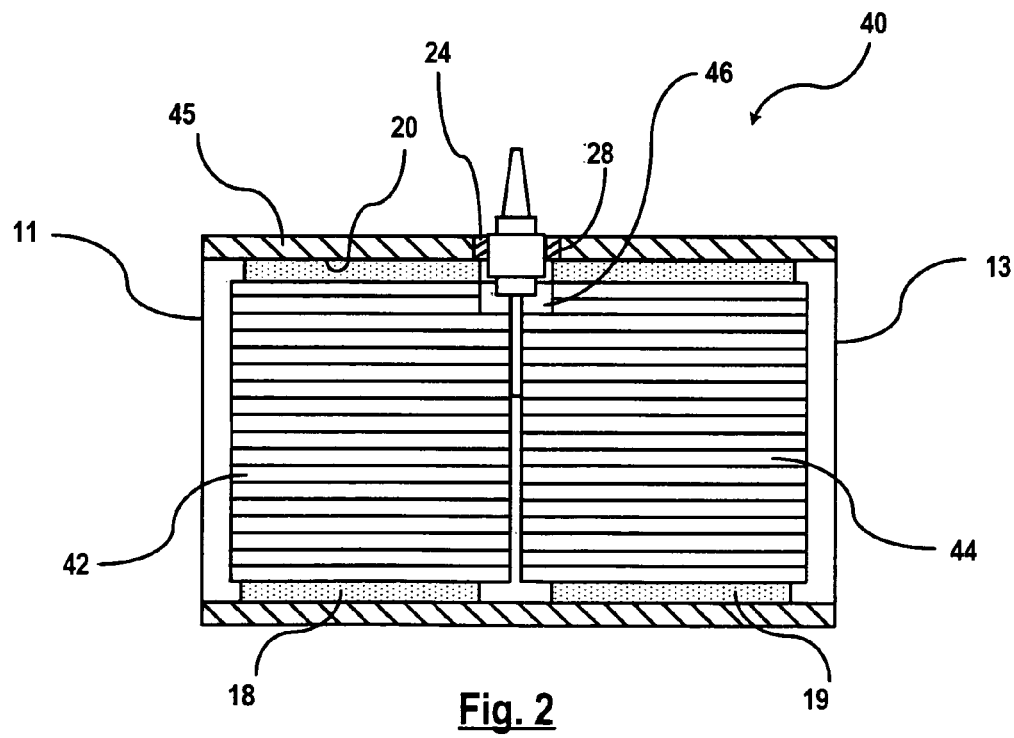
FIG. 2 is a cross section view of a catalytic converter assembly according to a first preferred embodiment.

FIG. 2 illustrates a cross section view of a catalytic converter assembly 40 according to a first preferred embodiment. The catalytic converter assembly 40 includes the first substrate 42 and the second substrate 44 juxtaposed to one another. A first support member 18 is disposed between the inner surface 20 of the housing 45 and the first substrate 42. The second support member 19 is disposed between the inner surface 20 of the housing 45 and the second substrate 44. A sensor cavity 46 is formed between the first substrate 42 and the second substrate 44 for receiving the sensor 28 therein.

Figure 3:
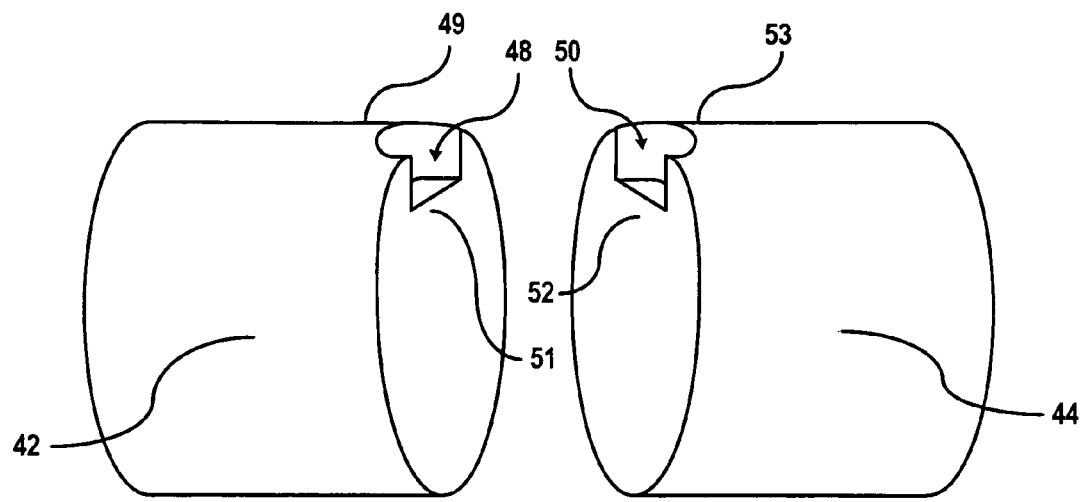
FIG. 3 is a perspective view of the substrates of the catalytic converter assembly according to the first preferred embodiment.

FIG. 3 illustrates perspective views of the first substrate 42 and the second substrate 44 according to the first preferred embodiment. The first substrate 42 includes a first partial cavity 48 that is disposed at a first end 51 of the first substrate 42. Preferably, the first partial cavity 48 is formed by a high speed drilling operation which creates a bore through an exterior circumferential surface 49 of the first substrate 42. Alternatively, other processes may be used for form the cavity including, but not limited to a cutting operation. The first partial cavity 48 is open-ended to the first end 51 of the first substrate 42 as well as the exterior circumferential surface 49 of the first substrate 42 for forming a first half of the sensor cavity 46 (shown in FIG. 2).

The second substrate 44 includes a second partial cavity 50 that is disposed at a first end 52 of the second substrate 44. Preferably the second partial cavity 50 is formed by a high speed drilling operation which creates a bore through an exterior circumferential surface 53 of the first substrate 44. Alternatively, other processes may be used for form the cavity including, but not limited to a cutting operation. The second partial cavity 50 is open-ended to the second end 52 of the second substrate 44 as well as the exterior circumferential surface 53 of the second substrate 44 for forming a second half of the sensor cavity 46.

Referring to both FIG. 2 and FIG. 3, as the first substrate 42 and the second substrate 44 are assembled within the housing 45 into a juxtaposed position, the first substrate 42 and the second substrate 44 are angularly aligned for aligning the first partial cavity 48 and the second partial cavity 50 for forming the sensor cavity 46. The first partial cavity 48 and the second partial cavity 50 may either be aligned prior to being inserted within the housing 45 or the substrates may be rotated as required after each substrate is assembled for aligning the first partial cavity 48 and second partial cavity 50 to form the sensor cavity 46. The first partial cavity 48 and the second partial cavity 50 must be in radial alignment with the aperture 26 formed in the housing 45 for receiving the sensor 26 therethrough.

The formation of the sensor cavity 46 within the first substrate 42 and the second substrate 44 permits the first substrate 42 and the second substrate 44 to be positioned closer to one another which allows the overall axial length of the catalytic converter assembly 40, specifically the housing 45, to be shortened. The advantage is the shortened catalytic converter assembly 40 provides for a reduced packaging space in a vehicle; provides for a reduction of the material required for producing the housing; provides added support and prevents tilting of the substrates.

Figure 4:
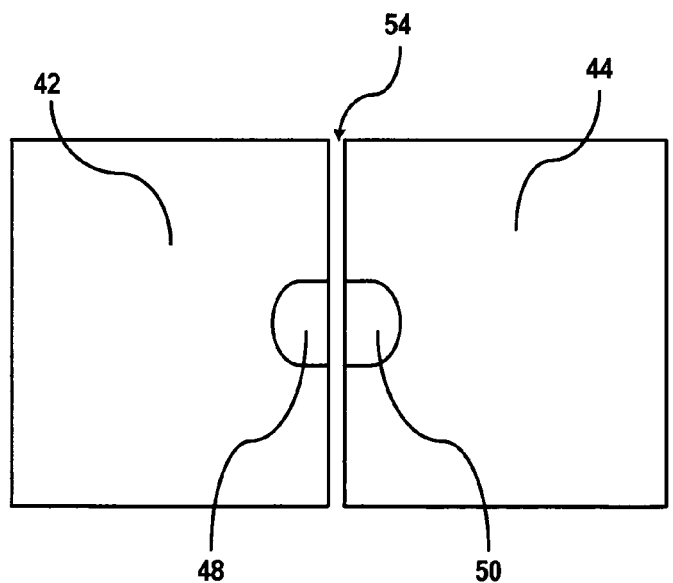
FIG. 4 is a top view of the substrates of the catalytic converter assembly according to the first preferred embodiment.

FIG. 4 illustrates a top view of the first substrate 42 and the second substrate 44 according to a first preferred embodiment. The first substrate 42 and the second substrate 44 are assembled such that there is a reduced gap width 54 between the respective substrates. The gap width 27 between the first substrate 16 and the second substrate 22 of a prior art catalytic converter assembly (as shown in FIG. 1) is of a width in that is larger than a width of the sensor 26. In FIG. 4, the positioning of the first substrate 42 closer to the second substrate 44 as a result of the cavity 46 allows the gap width 54 (i.e., spacing) to be substantially narrowed. The gap width 54 may be narrowed to any predetermined gap width that is less than that shown in FIG. 1 including a 0 mm gap width which prevents movement/tilting of the respective substrates.

Figure 5:
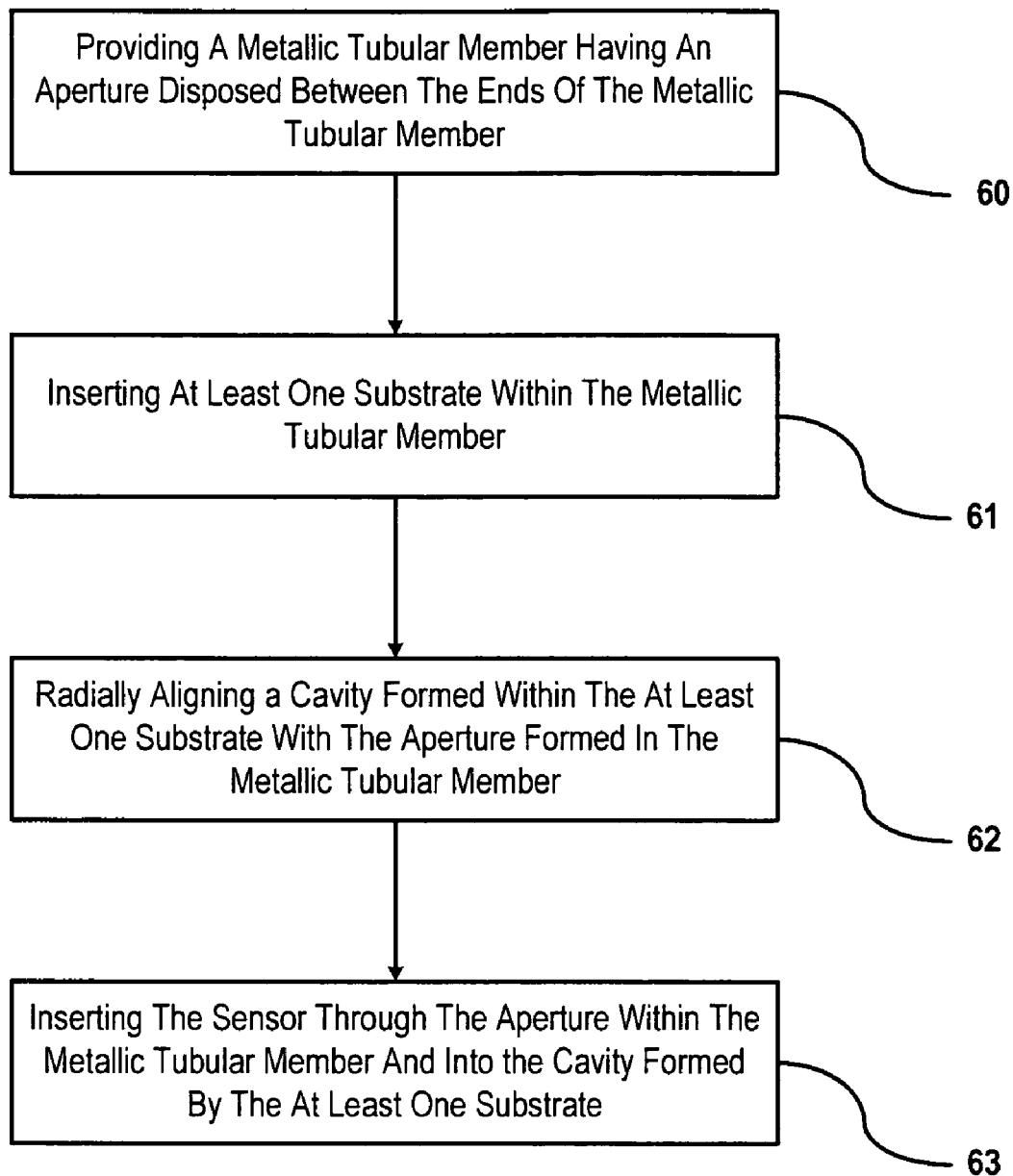
FIG. 5 is a method for assembling a catalytic converter assembly according to the first preferred embodiment.

FIG. 5 illustrates a method of assembling the catalytic converter according to the first preferred embodiment. In step 60, a metallic tubular member is provided having a first end and a second end. The tubular member includes an aperture formed between the first end and the second end and adapted to receive a sensor. In step 61, at least one substrate is inserted within the metallic tubular member. The at least one substrate includes a sensor cavity formed in an exterior surface of the at least one substrate. The sensor cavity extends radially inward to a predetermined depth. In step 62, the sensor cavity is radially aligned with the aperture of the metallic tubular member. If more than one substrate is utilized where partial cavities are formed on the end portions of each substrate, one or more of the respective substrates are rotated to angularly align the partial cavities for cooperatively forming the sensor cavity. In step 63, a sensor is inserted through the aperture and into the sensor cavity formed by the at least one substrate for monitoring gas content during the operation of the vehicle. It must be understood that the method described above is only one embodiment of assembling the catalytic converter and the assembly of the catalytic converter may be practiced otherwise than as specifically explained and illustrated without departing from its spirit or scope.

Figure 6:
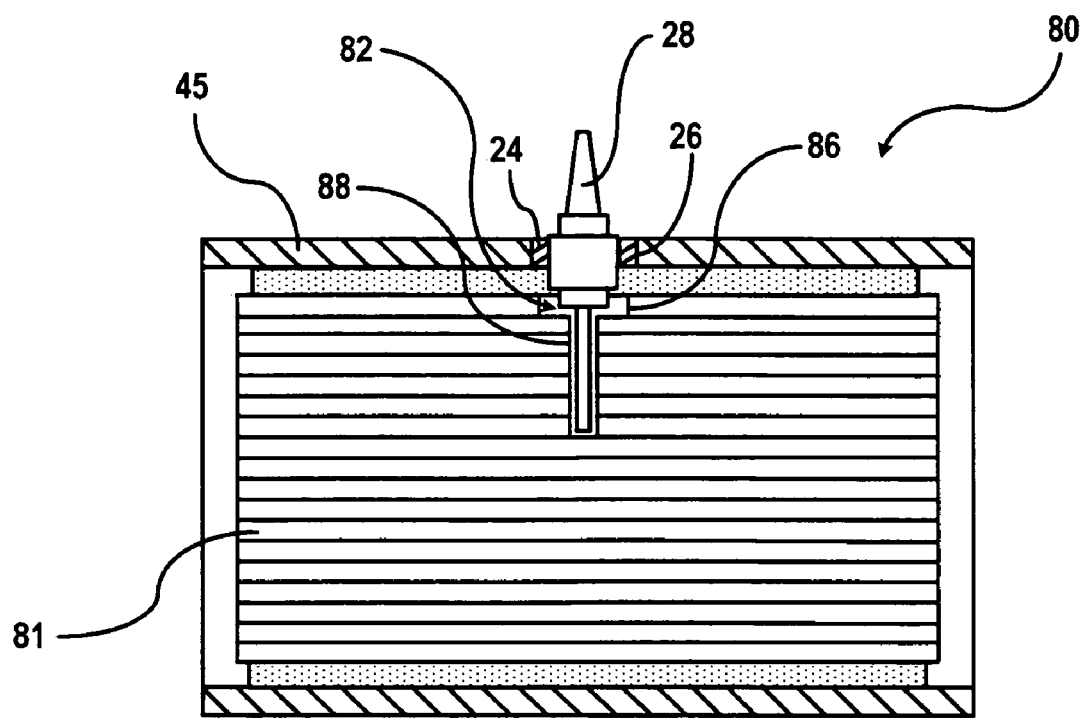
FIG. 6 is a cross section view of a catalytic converter assembly according to a second preferred embodiment.

FIG. 6 illustrates a catalytic converter assembly 80 according to a second preferred embodiment. The catalytic converter assembly 80 includes a single substrate 81 having a sensor cavity shown generally at 82. The sensor cavity 82 extends radially inward to a predetermined depth and includes a profile similar to a profile of the sensor 28. The substrate 81 may be radially aligned with the aperture 26 prior to being assembled within the housing 45 or may be rotated after assembly for alignment with the aperture 26. The sensor cavity 82 is formed by one or more high speed drilling operations. For example, a first high speed drilling operation may produce a first bore 86. Thereafter, a second high speed drilling operation is used to form the second bore 88. Alternatively, other processes may be used for form the cavity including, but not limited to a cutting operation. It is noted that the sensor cavity 82 may include the other shapes and is not limited to the shape of the respective sensor as shown.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A catalytic converter assembly comprising:
    a metallic tubular member having a first end and a second end, the metallic tubular member including an aperture centrally formed between the first end and the second end;
    a sensor being received in the aperture and extending into an interior of the metallic tubular member for sensing a content of gas flowing through the metallic tubular member; and
    at least one substrate disposed within the metallic tubular member, the at least one substrate having a cavity formed in an exterior surface of the at least one substrate and extending radially inward, the cavity being aligned with the aperture of the metallic tubular member for receiving a portion of the sensor extending into the interior of the metallic tubular member.

2. The catalytic converter assembly of claim 1 wherein the cavity is formed centrally between a first end and a second end of the at least one substrate.

3. The catalytic converter assembly of claim 1 comprising a first substrate and a second substrate, the first substrate being juxtaposed to the second substrate within the metallic tubular member, the cavity being formed by a first partial cavity formed at a first end of the first substrate and a second partial cavity formed at a first end of the second substrate that is juxtaposed to the first end of the first substrate, the first partial cavity and the second partial cavity are aligned to jointly receive the sensor therein.

4. The catalytic converter assembly of claim 1 wherein a spacing between the first substrate and the second substrate is of a predetermined distance which less than a width of the sensor.

5. The catalytic converter assembly of claim 1 wherein the cavity has a profile substantially identical to a profile of the portion of the sensor disposed within the interior of the metallic tubular member.

6. The catalytic converter assembly of claim 1 further comprising a sensor boss received by the aperture, the sensor boss receiving the sensor therethrough for securing the sensor to the metallic tubular member.

7. A method of forming a catalytic converter assembly having at least one substrate, the method comprising the steps of:
    providing a metallic tubular member having a first end and a second end, the metallic tubular member having an aperture centrally formed between the first end and the second end and adapted to receive a sensor;
    inserting the at least one substrate within the metallic tubular member, the at least one substrate having a cavity formed in an exterior surface of the at least one substrate and extending radially inward;
    aligning the cavity with the aperture;
    extending the sensor through the aperture into an interior of the metallic tubular member to be received by the cavity formed in the at least one sensor; and
    securing the sensor to the metallic tubular member.

8. The method of claim 7 comprising a first substrate and a second substrate, the first substrate being juxtaposed to the second substrate within the metallic tubular member, the cavity being formed by a first partial cavity formed at a first end of the first substrate and a second partial cavity formed at a first end of the second substrate that is juxtaposed to the first end of the first substrate.

9. The method of claim 8 further comprising the step of angularly aligning the first substrate and the second substrate prior to being inserted within the interior of the metallic tubular member so as to align the first partial cavity and the second partial cavity for forming the cavity when in a juxtaposed position.

10. The method of claim 8 comprising the step of angularly aligning the first substrate and the second substrate after being inserted within the interior of the metallic tubular member so as to align the first partial cavity and the second partial cavity for forming the cavity when in a juxtaposed position.

11. The method of claim 7 further comprising the step of securing a sensor boss within the aperture of the metallic tubular member, the sensor being secured to the sensor boss.

12. The method of claim 7 wherein a spacing between the first substrate and the second substrate is of a predetermined distance which less than a width of the sensor.

* * * * *